(12) United States Patent
Miatkowski (10) Patent No.: US 9,185,895 B1
(45) Date of Patent: Nov. 17, 2015

(54) MEASURING DEVICE (71) Applicant: Konrad Miatkowski, North Andover, MA (US)

(72) Inventor: Konrad Miatkowski, North Andover, MA (US)

( * ) Notice: Subject to any disclaimer, the term of this patent is extended or adjusted under 35 U.S.C. 154(b) by 120 days.

(21) Appl. No.: 14/198,622

(22) Filed: Mar. 6, 2014

Related U.S. Application Data (60) Provisional application No. 61/790,307, filed on Mar. 15, 2013.

(51) Int. Cl.
*A01K 99/00* (2006.01)
*A01K 97/00* (2006.01)
*G01B 3/10* (2006.01)

(52) U.S. Cl.
CPC ............... *A01K 99/00* (2013.01); *A01K 97/00* (2013.01); *G01B 3/1002* (2013.01)

(58) Field of Classification Search
CPC ..... A01K 99/00; A01K 97/00; A61B 5/1072; G01B 3/1002
USPC ............................ 33/511, 485, 493, 495, 458
See application file for complete search history.

(56) References Cited

U.S. PATENT DOCUMENTS

| | | | | |
|---|---|---|---|---|
| 1,608,713 A * | 11/1926 | Anderson | ............... | G01B 3/06 33/458 |
| 1,964,425 A * | 6/1934 | Bowman | ............. | A01K 87/007 33/485 |
| 2,797,489 A * | 7/1957 | Roe | ..................... | G01B 3/1082 33/495 |
| 3,259,988 A * | 7/1966 | Lunn | ..................... | A01K 97/00 33/501 |
| 5,097,617 A * | 3/1992 | Craven | ................... | A01K 97/00 33/485 |
| 5,148,607 A * | 9/1992 | Lasiter | .................. | A01K 97/00 206/315.11 |
| 5,531,028 A * | 7/1996 | Flippen | ................ | G01B 3/1002 33/1 B |
| 6,115,932 A * | 9/2000 | Fedora | .................. | A01K 97/00 33/494 |
| 6,415,521 B1 * | 7/2002 | Schnell | .................. | A01K 97/00 33/485 |
| 6,594,939 B2 * | 7/2003 | Ondusko | ............... | A01K 97/00 33/464 |
| 6,959,499 B2 * | 11/2005 | Bini | ....................... | A01K 97/00 33/511 |
| 7,228,638 B2 * | 6/2007 | Goodwin | .............. | A01K 29/00 33/511 |
| 2011/0192046 A1 * | 8/2011 | Kinziger | ............... | A01K 97/00 33/759 |

* cited by examiner

*Primary Examiner* — Christopher Fulton
(74) *Attorney, Agent, or Firm* — Anderson Gorecki & Rouille LLP (57) ABSTRACT

A measuring device is formed to have one or more joint structures, each joint structure connecting two deformable resilient concave elongated pieces of material (U-channel sections). The joint structure selectively enables the two U-channel sections to be held relative to each other in a substantially overlapping unextended position as well as in a substantially non-overlapping extended position. In both positions, the resilience of the material enables the U-channel sections to be substantially positionally secured relative to each other. The deformable nature of the material enables the U-channel sections to be rotated relative to each other to transition from the collapsed position to the extended position, or from the extended position to the collapsed position. Continuous linear graduated markings are applied to the U-channel sections.

20 Claims, 13 Drawing Sheets

MEASURING DEVICE

CROSS-REFERENCE TO RELATED APPLICATIONS

This application claims priority to U.S. Provisional Patent Application No. 61/790,307, filed Mar. 15, 2013, the content of which is hereby incorporated herein by reference.

BACKGROUND

This disclosure relates to measuring devices and, more particularly, to a portable measuring device for measuring the physical dimensions of an object such as wildlife.

SUMMARY

The following Summary and the Abstract are provided herein to introduce some concepts discussed in the Detailed Description below. The Summary and Abstract sections are not comprehensive and are not intended to delineate the scope of protectable subject matter. All examples and features mentioned below can be combined in any technically possible way.

A joint structure is formed between two deformable resilient concave elongated pieces of material (U-channel sections). The joint structure selectively enables the two U-channel sections to be held relative to each other in a substantially overlapping unextended (collapsed) position as well as in a substantially non-overlapping extended position. In both positions, the resilience of the material enables the U-channel sections to be substantially positionally angularly secured relative to each other. The deformable nature of the material enables the U-channel sections to be rotated relative to each other to transition from the collapsed position to the extended position, or from the extended position to the collapsed position. In one embodiment, linear graduated markings are applied to the U-channel sections to enable a folding resilient U-shaped measuring device to be formed. The measuring device may be used to measure any length dimension. In one embodiment, the measuring device is sized to make it particularly suitable for measuring the physical dimensions of wildlife such as fish.

In one embodiment the measuring device is adapted to measure objects and the U-channel sections are formed as a trough, Optionally an end stop may be provided on one end of the measuring device. Linear graduated markings may be provided along the length of the measuring device starting at one end, such as at the end adjacent the end stop, and continue along the length of the extended U-channel sections. Subsequent sections may be extended out from a primary section to enable the measuring device to be extended to a length sufficient to measure the overall length of the object. Preferably the extending sections are disposed sequentially below the primary section so that the markings on the primary section and subsequent sections may be used to measure objects of varying length without requiring all sections of the measuring device to be extended to measure a shorter length object.

DETAILED DESCRIPTION

This disclosure is based, in part, on the realization that it is often beneficial to be able to measure the physical dimensions of an object, for example to document how large the object is. As an example: in a fishing tournament a person who catches a fish may need to measure the length of the fish to prove how large the fish was before releasing the fish back into the water. To enable the measurement to be trusted, the measurement must be able to be verified for example from a picture of the fish proximate the measuring device.

There are numerous measuring devices that may be used in this situation. For example, a measuring tape may be used in which the measuring tape is laid onto the fish. However, this type of measurement is often difficult to use, in practice, because it can be difficult to hold both a freshly caught flopping fish and the measuring tape while taking a picture of the fish.

Accordingly, fish measuring devices formed in the shape of a concave trough have been developed which are designed to cradle the fish while the fish is being measured. Unfortunately, existing measuring devices of this nature are often unwieldy. For example, if a measuring device is to be used to measure a fish that is in excess of 24-36 inches in length, the measuring device itself must also exceed 24-36 inches in length. On a fishing boat finding storage space for this type of measuring device may be inconvenient, as storage space on a boat is often limited. On smaller boats such as kayaks or canoes, having a trough shaped measuring device that is 24-36 inches in length may be particularly cumbersome.

According to an embodiment, a measuring device is formed from two or more U-shaped channel sections rotatably connected by a joint structure. The joint structure is formed by connecting two of the elongated U-channel sections with a mechanical fastener such as a rivet or bolt. Other common fasteners may be used as well and the particular type of fastener selected will depend on the implementation. In an environment where the fastener is likely to come into contact with corrosive elements, such as in a salt water environment, it may be desirable to use a fastener made out of a non-corrosive material such as stainless steel. Likewise, a separate mechanical fastener is not necessarily required, depending on the implementation. For example, the U-channel sections may be integrally formed with mating female and male connector pieces that snap together or otherwise enable the U-channel sections to be rotatably secured relative to each other. Accordingly, many structures may be used to pivotably connect the U-channel sections.

The U-channel sections generally have a U-shaped profile in cross-section. The U-shaped profile enables the measuring device to cradle a fish while in use. The U-shaped profile also provides longitudinal stiffness to each of the U-channel sections, to help maintain the shape of the U-shaped sections (and the measuring device) and to resist bending or deflection in a direction transverse to the general U-shape. The U-channel sections may be formed of any desired width, but in one embodiment the width of the channels is preferably sized to enable the measuring device to at least partially cradle a fish. Since longer fish are generally wider, larger (longer) measuring devices optionally may have wider U-channel sections than smaller (shorter) measuring devices.

The joint structures connecting the U-channel sections of the measuring device are formed such that the two elongated U-channel sections connected by a given joint structure may be rotated relative to each other about the mechanical fastener. The U-channel sections are made of pliable material which enables deflection of the material, but are also made of resilient material which will enable the material to substantially regain its original shape after deflection.

FIGS. 6-7 and 9-10 show an embodiment of a measuring device in which three U-channel sections 10A, 10B, 10C are connected together by fasteners 12A, 12B. Fastener 12A connects U-channel section 10A to U-channel section 10B, and fastener 12B connects U-channel section 10B to U-channel section 10C. Although three U-channel sections are shown in this embodiment connected by two connectors, additional or fewer connectors may be used to interconnect additional or fewer U-channel sections, such that different embodiments of the measuring device may include two, three, four, or more interconnected U-channel sections.

Figure 6:
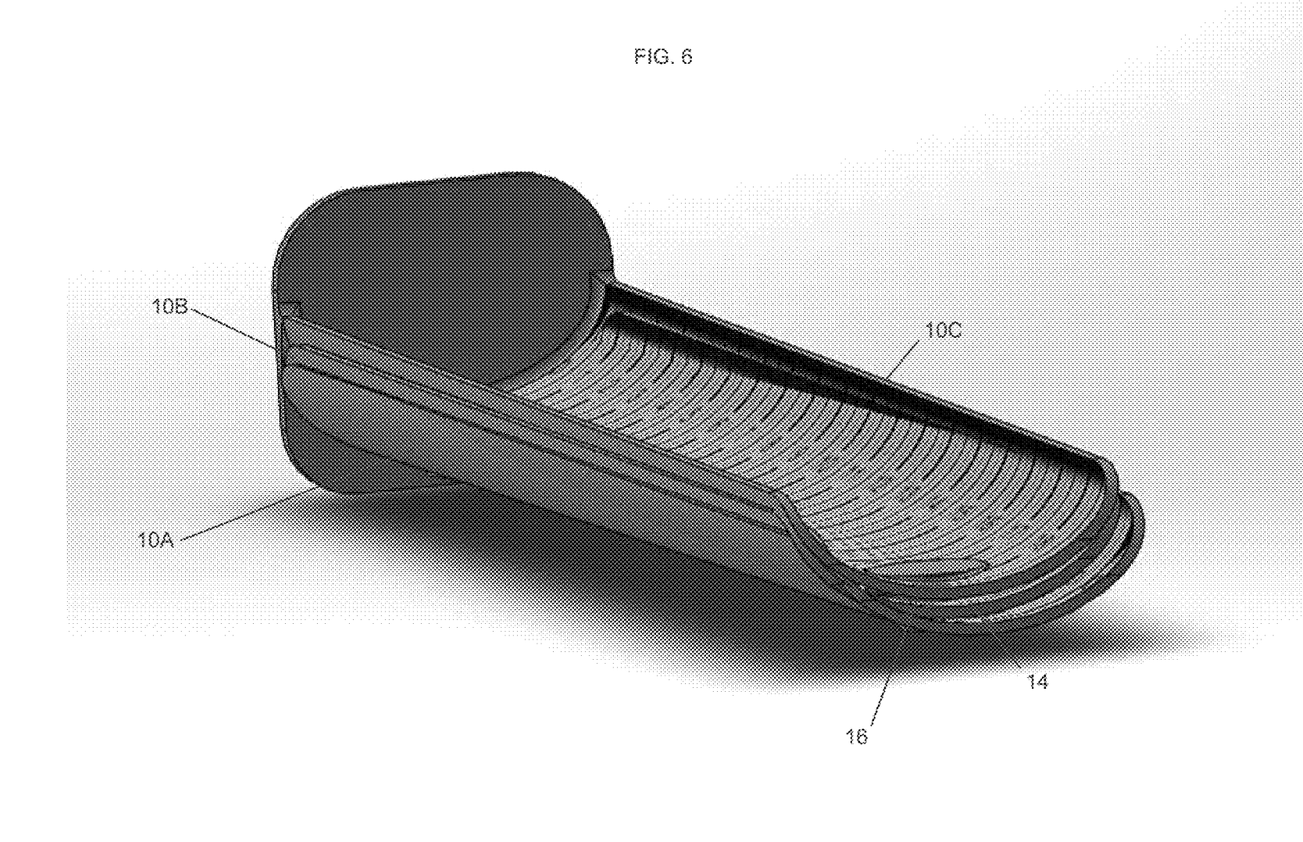
FIGS. 6 and 7 are a perspective views of three sections of an embodiment of a measuring device when in the collapsed position.
Figure 7:
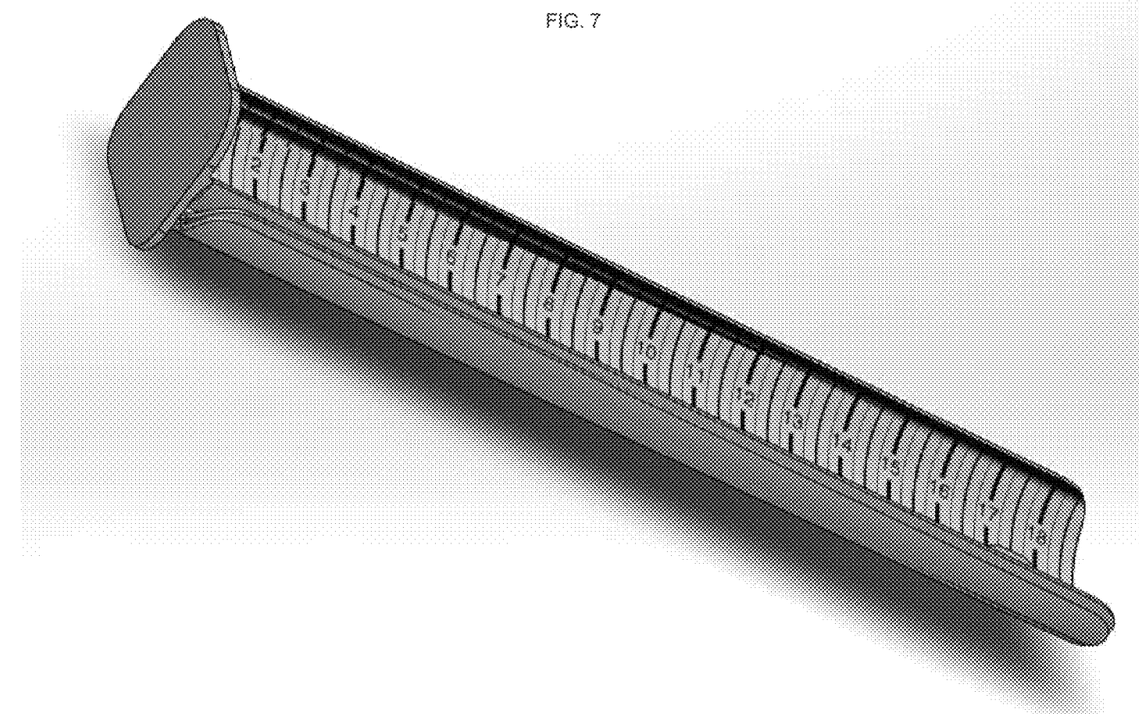
Figure 8:
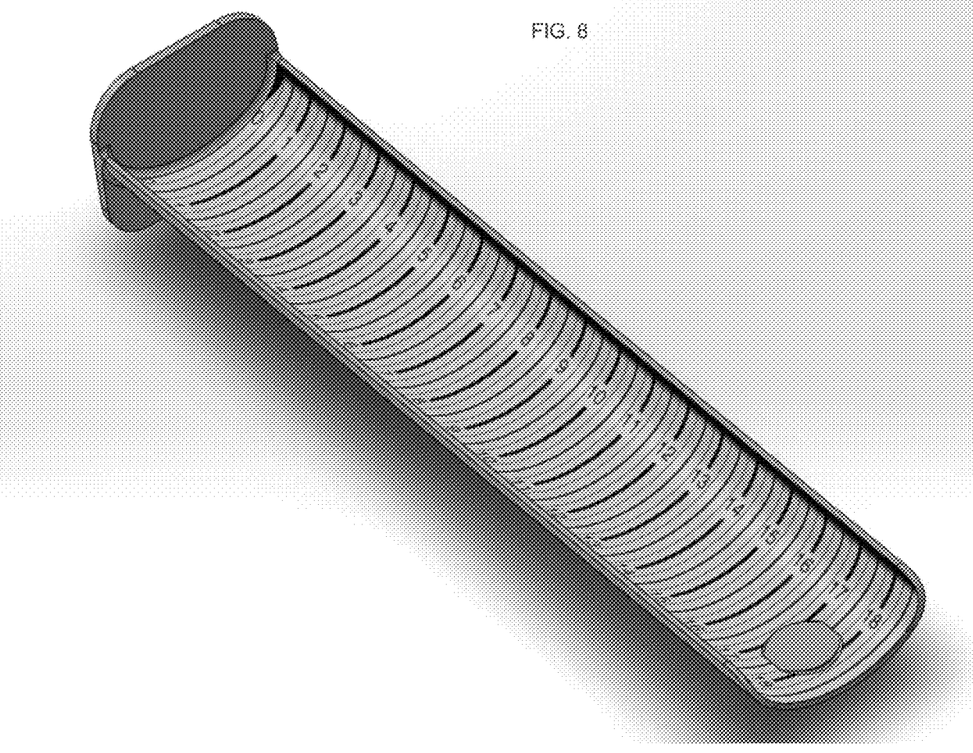
FIG. 8 is a top perspective view of one section of an embodiment of a measuring device.
Figure 9:
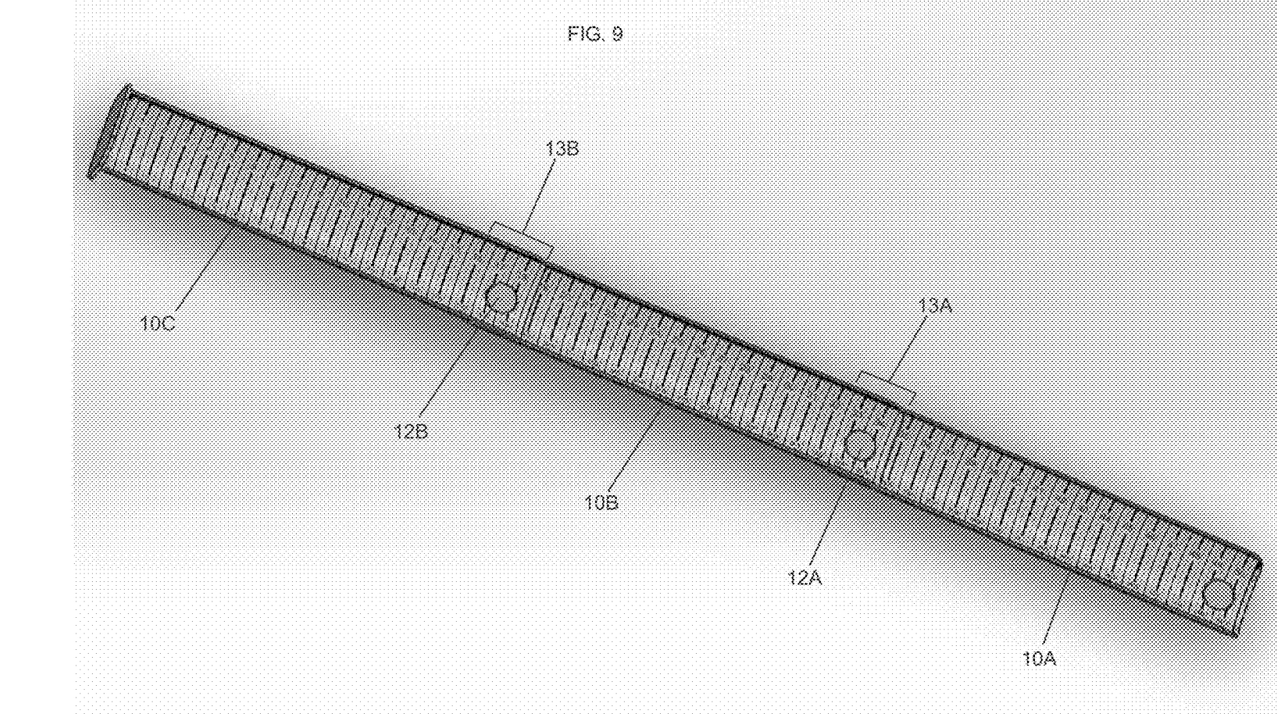
FIG. 9 is a top plan view of an embodiment of a measuring device including three U-channel sections in the extended position.
Figure 10:
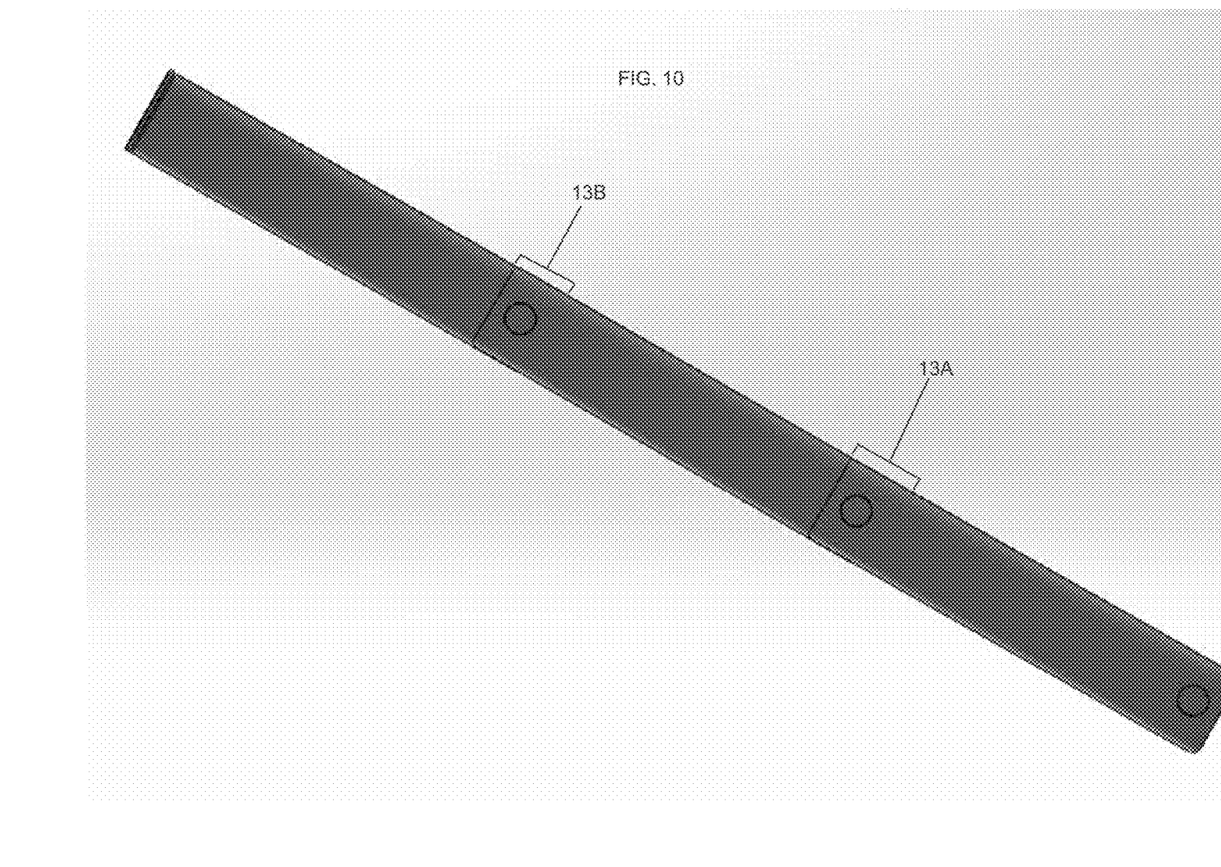
FIG. 10 is a bottom plan view of an embodiment of a measuring device including three U-channel sections in the extended position.

FIGS. 6-7 are perspective views of the embodiment of the measuring device in which the three U-channel sections are in the collapsed position, and FIGS. 9-10 are perspective views of the embodiment in which the three U-channel sections are in the extended position. FIGS. 1-5 show views of the measuring device when transitioning from the collapsed to the extended or from the extended to the collapsed positions. Specifically, as shown in these figures, the U-channel sections making up the measuring device are able to pivot about connectors 12A, 12B.

In the collapsed position, as shown in FIGS. 6 and 7, the U-channel sections nest substantially along their entire length. FIG. 6 shows an end view in which the manner in which the U-channel sections 10A and 10B nest is visible. As shown in FIG. 6, the U-channel sections have complimentary profiles such that the top surface 14 of the lower U-channel section 10B is substantially in contact or in close proximity to a lower surface 16 of the upper U-channel section 10A. In one embodiment, the U-channel sections have the same profile such that a radius of curvature of the concave surface of each of the U-channel sections is approximately the same. In another embodiment the U-channel sections are formed such that a radius of curvature of the lower surface 16 of the upper U-channel section 10A has the same radius of curvature as the top surface of the lower U-channel section 10B. In other embodiments the profile of the U-channel sections may not have a uniform radius of curvature. For example, rather than having a profile that is a section of a cylinder, as shown in FIGS. 1-5, the U-channel sections may alternatively have a profile that is more elliptical to flatten out the bottom of the U-channel sections. In still other embodiments the profile may be flatter to have a flat bottom and sloped side walls. Many different cross sections may be adopted for the U-channel sections and the term "U-channel" as used herein is not limited to a channel profile in which the material has a fixed radius of curvature when viewed in cross section.

Similarly, as shown in FIGS. 9-10, when the U-channel sections are in the extended position, the U-channel sections nest along an overlapping regions 13A, 13B such that the top surface of the lower U-channel section is substantially in contact or in close proximity to a lower surface of the upper U-channel section. By having these surfaces in close proximity to each other, the overall rigidity of the embodiment may be enhanced when the U-channel sections are positioned in the extended position.

Figure 1:
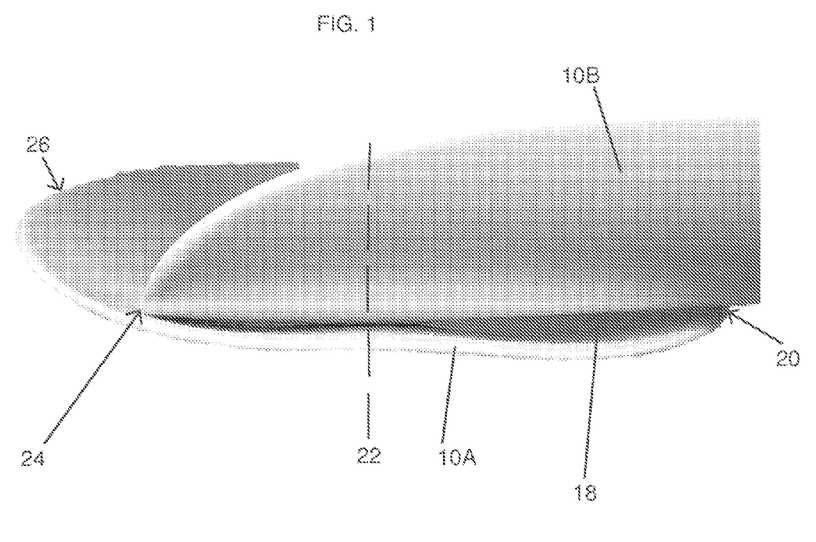
FIG. 1 is a front profile view of a joint structure of a measuring device according to an embodiment when transitioning from a collapsed position to the extended position, or from the extended position to the collapsed position.
Figure 2:
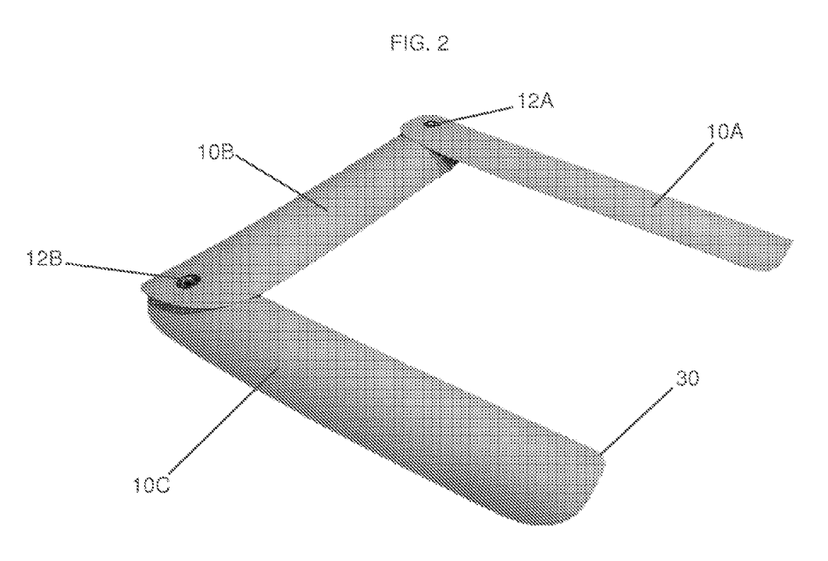
FIG. 2 is a bottom perspective view of an embodiment of a measuring device including three U-channel sections connected using two similar joint structures when transitioning from a collapsed position to the extended position, or from the extended position to the collapsed position.
Figure 3:
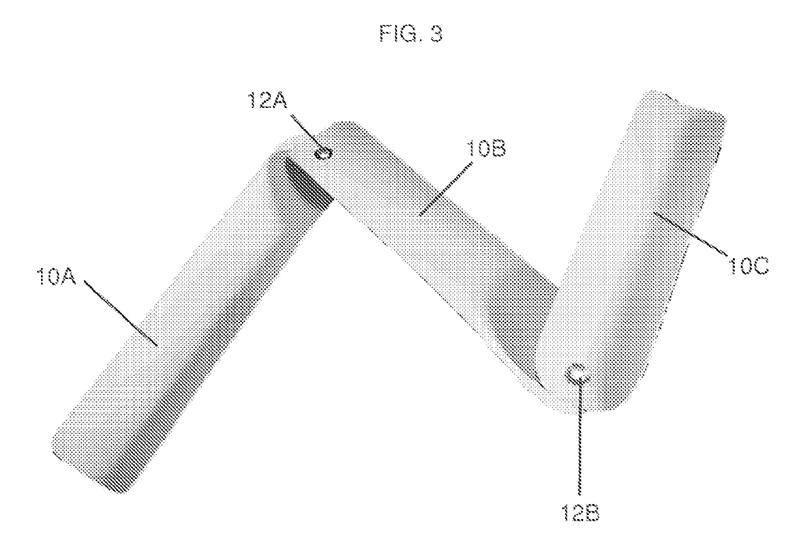
FIG. 3 is a top perspective view of an embodiment of a measuring device including three U-channel sections connected using two similar joint structures when transitioning from a collapsed position to the extended position, or from the extended position to the collapsed position.
Figure 4:
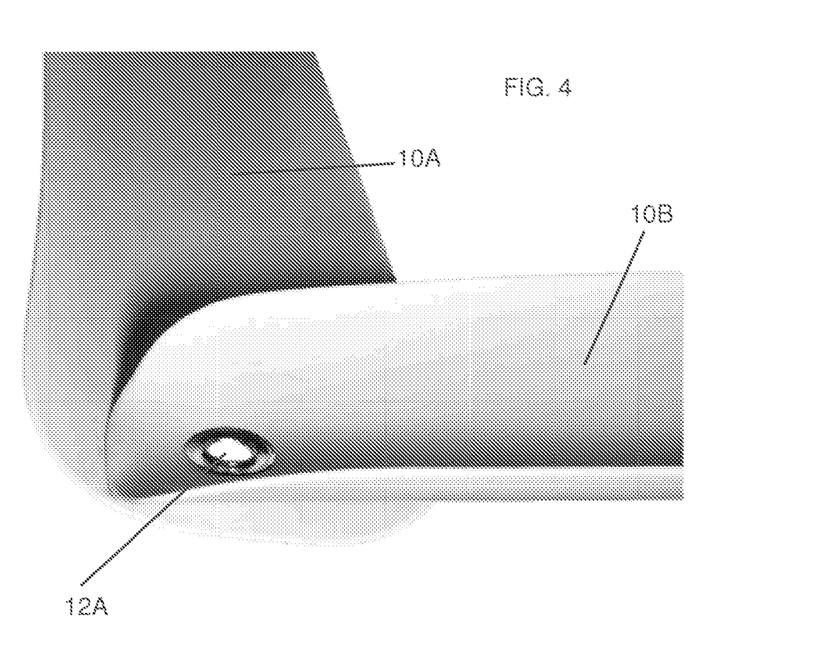
FIGS. 4 and 5 are top perspective views of the example joint structure of the measuring device of FIG. 1.
Figure 5:
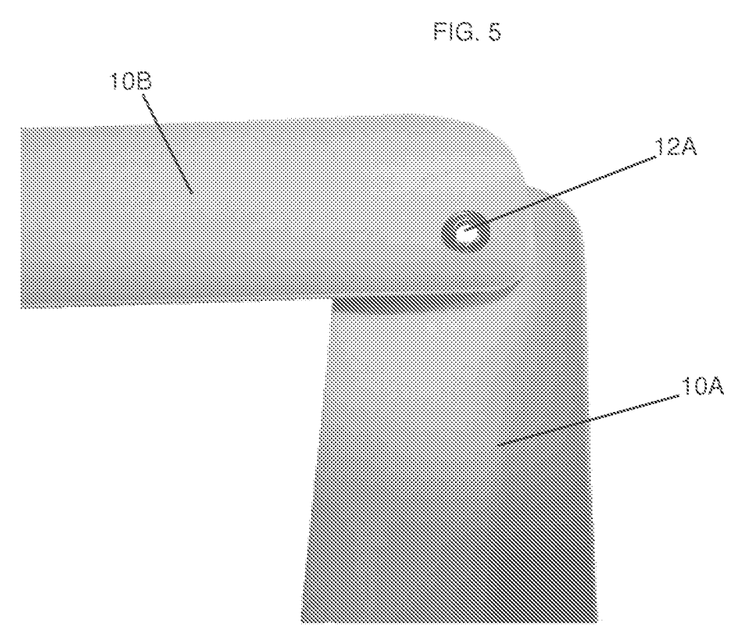
Figure 11:
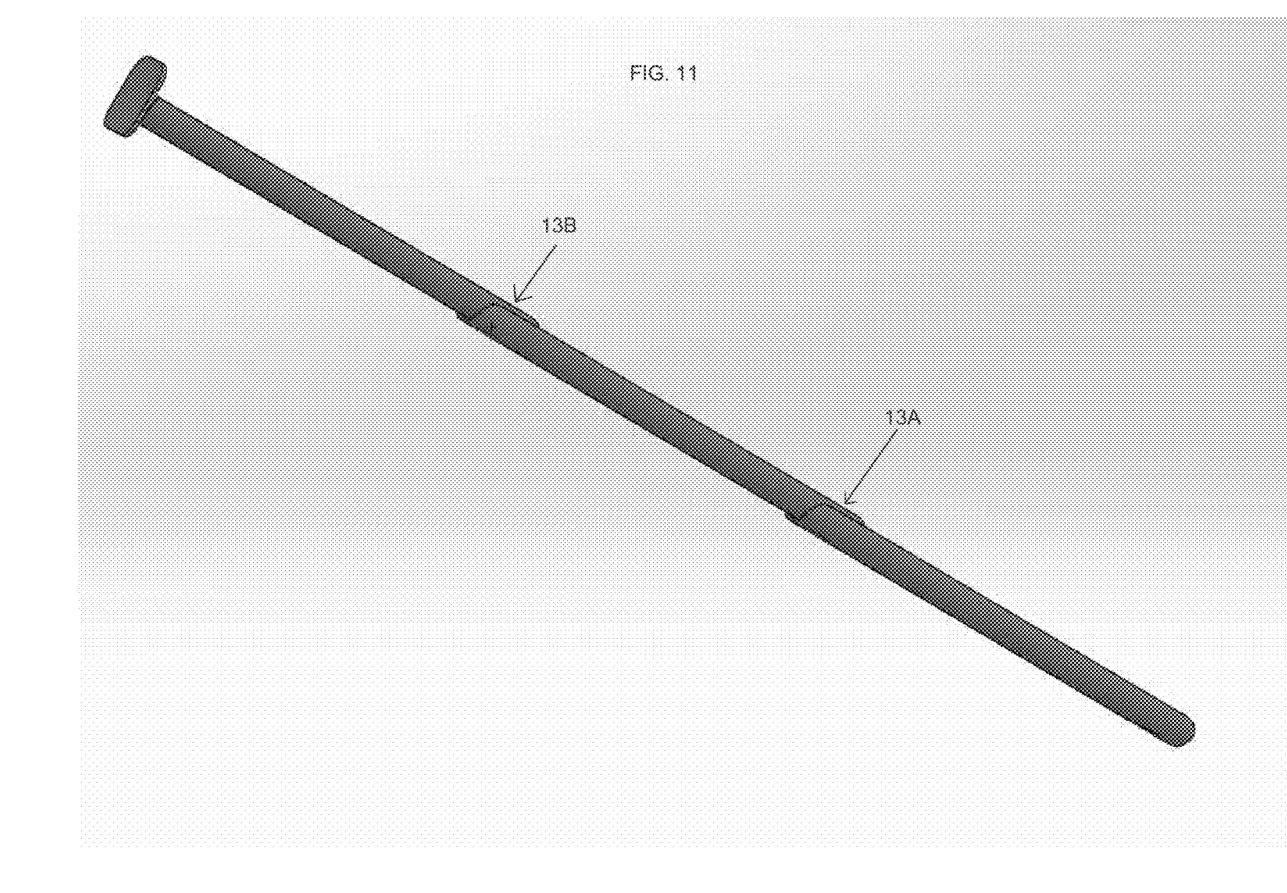
FIG. 11 is a side view of an embodiment of a measuring device including three U-channel sections in the extended position.
Figure 12:
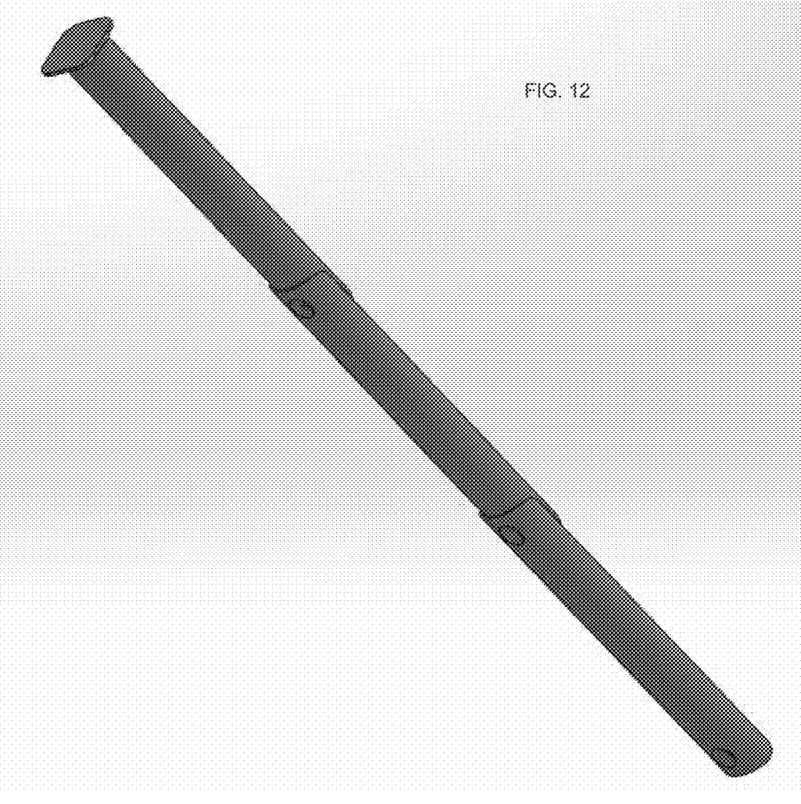
FIGS. 12 and 13 are a perspective view of an embodiment of a measuring device including three U-channel sections in the extended position.
Figure 13:
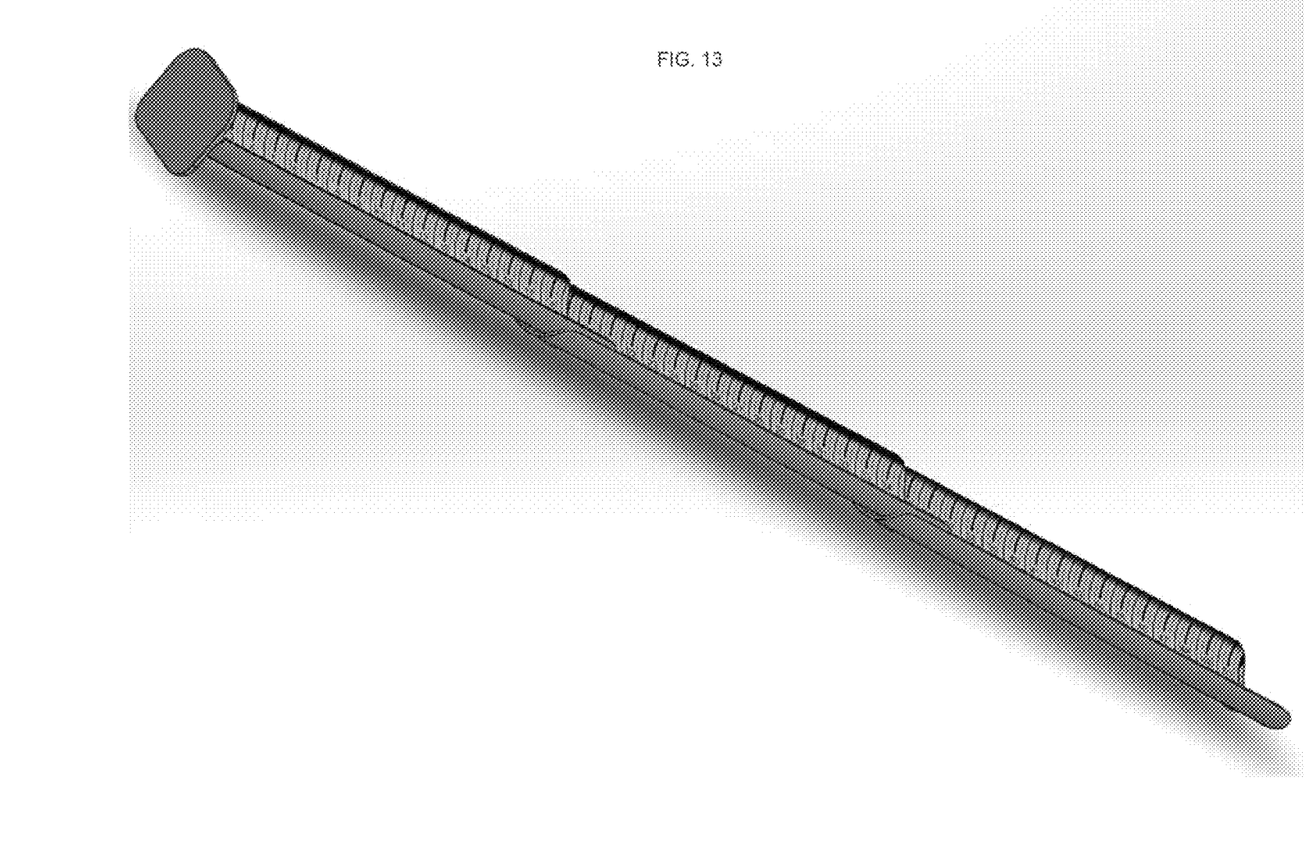

FIGS. 1-5 show the function of the joint between two U-channel sections forming the measuring device as the U-channel sections transition from a collapsed position to extended position or extended position to collapsed position. As shown in FIG. 1, in one embodiment the U-channel sections are formed of resilient deformable material. This deformable nature of the material enables the profile of the bottom U-channel section 10A to change as the U-channel section 10B is rotated about connector 12A. This enables the lower edge 18 of upper U-channel section 10B to pass over the top edge 20 of the lower U-channel section 10A so that the two U-channel sections are able to rotate relative to each other about the connector 12A. As shown in FIGS. 6, 11 and 12, upon completion of the transition, the resilient nature of the material enables the lower U-channel section 10B to substantially regain its original shape to hold the upper U-channel section 10A securely in either the extended position or the collapsed position.

In the example shown in FIG. 1, dashed line 22 shows an approximate pivot point of the U-shaped sections relative to each other about connector 12A. As shown in FIG. 1, in this example the pivot point 22 is set to be relatively close to the end of the top U-channel section 10B, such that an end 24 of the top U-channel sections does not extend over top edge 26 of bottom U-channel section during the transition between extended and collapsed positions. In other embodiments this may be changed such that end 24 extends further out toward the top edge 26 or so that end 24 extends beyond top edge 26 during the transition between extended and collapsed positions. Changing the pivot point such that end 24 is further away from the pivot point will increase the rigidity of the measuring device when the U-channel sections are in the extended position. However, moving the pivot point away from the end 24 also decreases the length of the joined pair of U-channel sections when the U-channel sections are in the extended position by effectively increasing the amount of overlap between the U-channel sections when in the extended position.

As shown in the figures, the U-channel sections are formed of resilient material such that, when extended, the U-profiles nest and the resilient material holds the two U-channel sections relative to each other in a longitudinally extended manner. Likewise, the fact that the material is resilient enables the material to return substantially to its original shape after being deformed during the transition between extended and collapsed positions.

The U-channel sections may be formed of any material that exhibits the desired resilient and deformable properties described above. Embodiments may be made of plastic materials, metal materials, or other materials exhibiting shape memory that are both deformable to enable the U-channel sections to be rotated relative to each other, while also being sufficiently resilient to enable the material to regain its shape after the transition has occurred. Any suitable material may be used and the particular material selected will depend on the implementation. Likewise, different U-channel sections of a given measuring device may be formed of different materials and are not all required to be made of the same material.

The joint structure described herein enables a collapsible measuring device to be formed of multiple sections which may be folded for storage or extended and used to measure an object such as a fish. Although the measuring device is, in one embodiment, designed to be used for measuring wildlife such as fish, the measuring device may be used to measure other objects and dimensions as well.

As shown in FIGS. 6-9 and 13, linear graduated markings may be applied to the U-shaped channel sections starting at a free end of primary (top) U-channel section 10C and sequentially extending from the top U-channel section 10C to U-channel section 10B and then to U-channel section 10A. Thus, for example, linear graduated markings indicating inch, half inch, and quarter inch (or centimeters and millimeters), may start at zero at free end 30 of the top U-channel section. These graduated markings may extend the length of top U-channel section 10C and then continue onto the next lower U-channel section 10B. The markings on lower U-channel section 10B may extend the length of U-channel section 10B and then continue onto U-channel section 10A.

By starting the graduated markings on the free end 30 of upper channel section 10C, the upper U-channel section may be used to measure fish and other objects that are as long as the top channel section without requiring any of the other channel sections to be extended. If an object to be measured exceeds the length of the upper U-channel section, the next lower U-channel section may be extended and, because the markings on the next lower U-channel section continue the indexed markings of the upper section, the first two U-channel sections may be used to measure the length of objects that are up to approximately twice the length of the upper U-channel section. If the object to be measured is longer than the first two U-channel sections, additional lower U-channel sections may be extended to enable longer objects to be measured. Although an embodiment may have 3 U-channel sections as shown, other embodiments may include only 2 U-channel sections or may include more than 3 U-channel sections.

The linear graduated markings may be placed on the U-channel sections by etching, scribing, painting, printing, by forming raised ridges, by some combination of these techniques or in another manner. In one embodiment, the linear graduated markings are formed of a color that contrasts with a color of the surrounding material forming the U-channel sections so that the linear graduated markings are clearly visible in photographs. In addition to the markings, numbers identifying the markings are preferably applied. For example, sequential numbers associated with inch or centimeter graduated markings may be included.

In one embodiment, the linear graduated markings are applied on the concave surface of the U-channel sections. Optionally the linear graduated markings may be applied on the convex surface as well or instead of the concave surface. As indicated above, the linear graduated markings may indicate length using either the US measurement system of inches/feet/yards or the metric measurement system of millimeters/centimeters/meters. Other markings may be applied as well.

Since the linear graduated markings are continuous along the channels, when the channels are in the extended position, it is easy to measure the length of an object simply by placing the object on the measuring device. The concave profile of the measuring device cradles the object to hold the object while it is being measured.

Because the U-shaped channel sections are rigidly connected together, rather than sliding relative to each other, the length of the extended measuring device is easily verified so that inaccuracies associated with measuring devices that have sliding components may be avoided.

In one embodiment an end stop 11 is applied at an end of the measuring device, for example at an end of the measuring device where the linear graduated markings begin. The end stop may have any desired shape, but in one implementation has a flat bottom to enable the measuring device to sit flat on a surface to prevent the measuring device from rocking from side to side. The end stop may also include a hook or aperture to enable the measuring device to be secured when not in use.

Although an embodiment has been described in which the measuring device is configured to be used to measure objects such as fish, the extendable measuring devices may be used in other contexts as well. For example, in connection with measuring the depth of liquid or loose granular material, it may be desirable to use an extendable device such as the embodiments described above instead of using a solid measuring device. Example instances where this could be useful include measuring the depth of liquid stored in a barrel, tank, reservoir, underground gas tank, grain storage bin, or in other similar contexts. Likewise in construction it is often desirable to be able to measure dimensions of construction materials and the measuring device described herein may be used in this and other contexts as well.

Various changes and modifications of the embodiments shown in the drawings and described in the specification may be made. Accordingly, it is intended that all matter contained in the above description and shown in the accompanying drawings be interpreted in an illustrative and not in a limiting sense.

What is claimed is:

1. A measuring device, comprising:
  a first U-shaped channel section;
  a second U-shaped channel section formed from deformable resilient concave material; and
  a first joint interconnecting a first end of the first U-shaped channel section with a first end of the second U-shaped channel section;
  wherein the first joint interconnecting the first end of the first U-shaped channel section with the first end of the second U-shaped channel section enables the first U-shaped channel section to pivot relative to the second U-shaped channel section.

2. The measuring device of claim 1, wherein the first U-shaped channel section is formed from deformable resilient concave material.

3. The measuring device of claim 1, wherein pivoting movement of the first U-shaped channel section relative to the second U-shaped channel section causes deflection of the deformable resilient concave material of the second U-shaped channel section.

4. The measuring device of claim 1, wherein the first U-shaped channel section has a first profile; and wherein the second U-shaped channel section has a second profile, the second profile being complimentary to the first profile to enable the first and second U-shaped channel sections to nest.

5. The measuring device of claim 4, wherein the first profile has a relatively constant radius of curvature.

6. The measuring device of claim 4, wherein the first profile is semi-elliptical to have a flatter bottom.

7. The measuring device of claim 4, wherein the first joint enables the first and second U-shaped channel sections to transition from a collapsed position to an extended position.

8. The measuring device of claim 7, wherein the first and second U-shaped channel sections nest substantially along their entire length in the collapsed position and wherein the first and second U-shaped channel sections nest only in the region of the first ends while in the extended position.

9. The measuring device of claim 1, further comprising a third U-shaped channel; and
a second joint interconnecting a first end of the third U-shaped channel section with a second end of the second U-shaped channel section.

10. The measuring device of claim 9, wherein the third U-shaped channel section is formed from deformable resilient concave material.

11. The measuring device of claim 1, further comprising linear graduated markings on the first and second U-shaped channel sections.

12. The measuring device of claim 11, wherein the linear graduated markings start on a second end of the first U-shaped channel section and continue sequentially from the first U-shaped channel section to the second U-shaped channel section.

13. The measuring device of claim 11, wherein each U-shaped channel section has a concave surface, and wherein the linear graduated markings are applied to the concave surface.

14. The measuring device of claim 1, further comprising an end plate on a second end of the first U-shaped channel section.

15. A measuring device, comprising:
a first U-shaped channel section;
a second U-shaped channel section formed from deformable resilient concave material pivotally connected to the first U-shaped channel section at a first end, the second U-shaped channel section being pivotable from a collapsed position in which the first and second U-shaped channel sections nest substantially along their entire length to an extended position in which the first and second U-shaped channel sections nest in an end region; and
wherein during pivoting movement of the second U-shaped channel section relative to the first U-shaped channel section associated with transition from the collapsed and extended positions, deflection of the deformable resilient concave material of the second U-shaped channel section occurs.

16. The measuring device of claim 15, further comprising an end plate on a second end of the first U-shaped channel section.

17. The measuring device of claim 15, wherein the first U-shaped channel section has a first profile; and wherein the second U-shaped channel section has a second profile, the second profile being complimentary to the first profile to enable the first and second U-shaped channel sections to nest.

18. The measuring device of claim 17, wherein the first profile has a relatively constant radius of curvature.

19. The measuring device of claim 17, wherein the first profile is semi-elliptical to have a flatter bottom.

20. The measuring device of claim 15, further comprising linear graduated markings on the first and second U-shaped channel sections.

* * * * *